United States Patent [19]

Mola

[11] 4,301,769
[45] Nov. 24, 1981

[54] POULTRY LOADING APPARATUS

[75] Inventor: Giuseppe Mola, Castelmella, Italy

[73] Assignee: G.M.G. System S.p.A., Roncadelle, Italy

[21] Appl. No.: 175,812

[22] Filed: Aug. 6, 1980

[30] Foreign Application Priority Data

Aug. 13, 1979 [IT] Italy .................. 5209 A/79

[51] Int. Cl.³ ............................ A01K 29/00
[52] U.S. Cl. .................................. 119/82
[58] Field of Search ..................... 119/82, 97

[56] References Cited

U.S. PATENT DOCUMENTS

| 3,420,211 | 1/1969 | Hartvickson | 119/82 |
| 3,568,643 | 3/1971 | Wessinger | 119/82 |
| 3,722,477 | 3/1973 | Weldy et al. | 119/82 |
| 3,958,536 | 5/1976 | Crowder | 119/82 |

Primary Examiner—Hugh R. Chamblee

Attorney, Agent, or Firm—Sughrue, Mion, Zinn, Macpeak and Seas

[57] ABSTRACT

Apparatus is provided for loading poultry from a rearing house into a series of hen-coops arranged in vertical rows on a transport vehicle. The apparatus includes an elevator conveyor which takes the animals from an assembly enclosure to a vehicle movable transversely of the elevator conveyor. This vehicle comprises a first horizontal conveyor extending parallel to the longitudinal axis of the vehicle and arranged to receive animals from the elevator conveyor, an adjustable-inclination conveyor disposed alongside the first horizontal conveyor, a second horizontal conveyor disposed transversely to the first horizontal conveyor and arranged to transfer animals from that conveyor onto the adjustable-inclination conveyor, and a pneumatic forced-delivery unit located transversely at the output end of the adjustable inclination conveyor.

11 Claims, 8 Drawing Figures

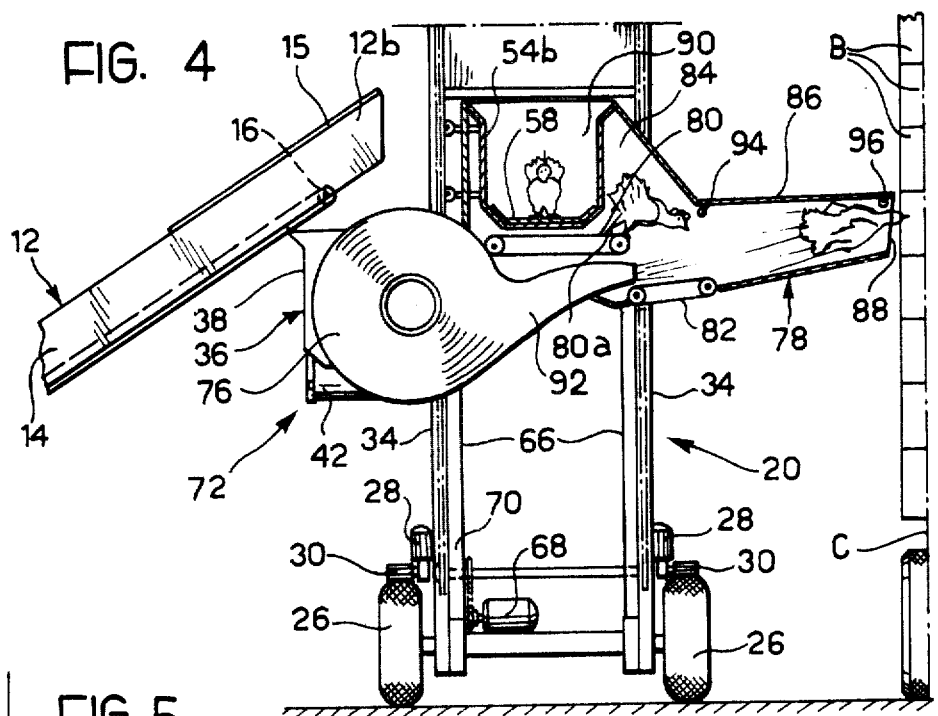
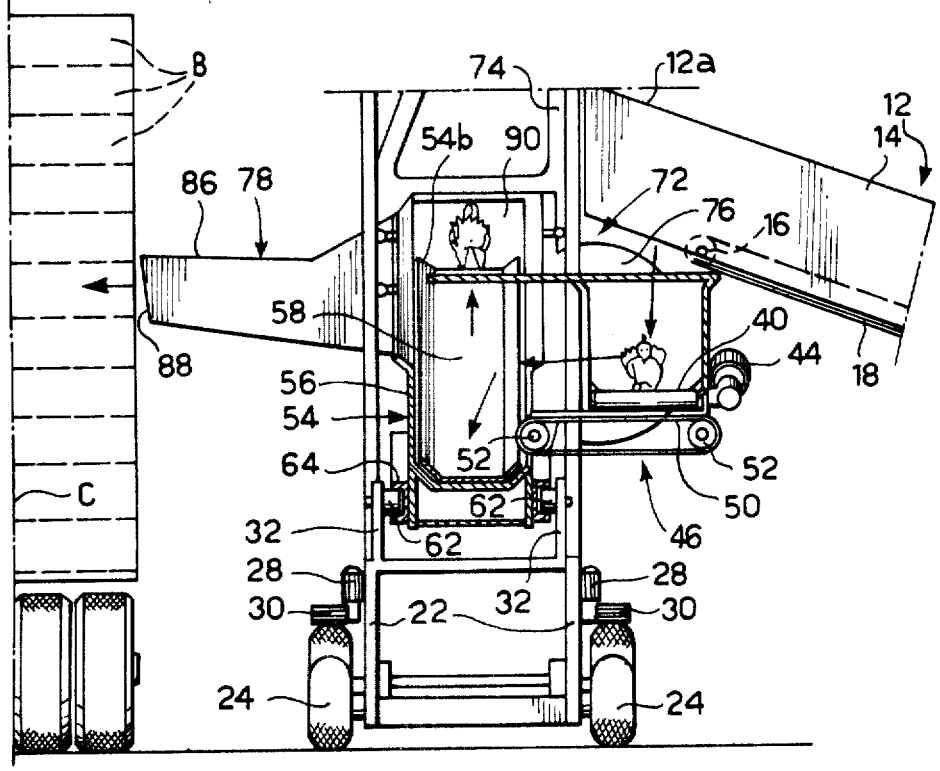

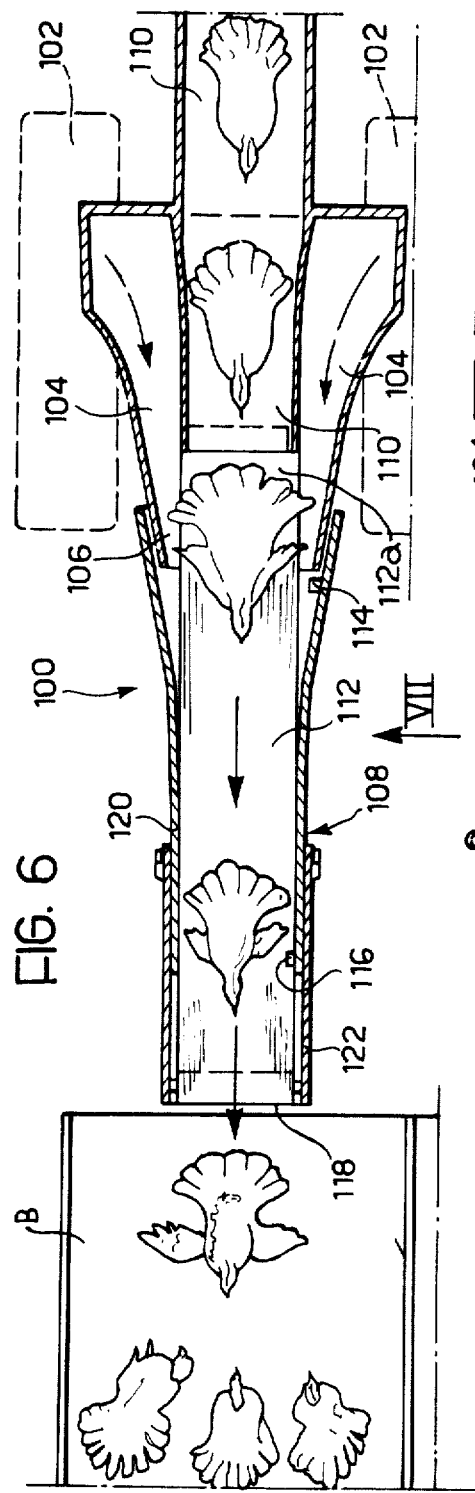
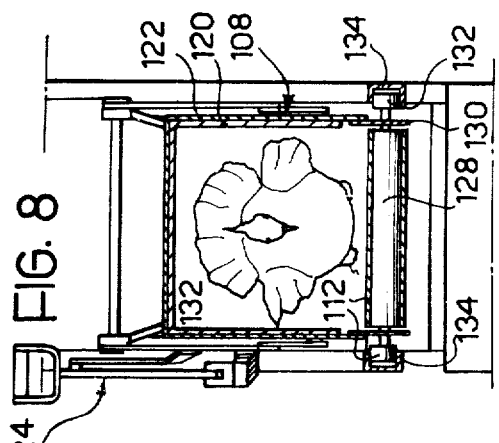
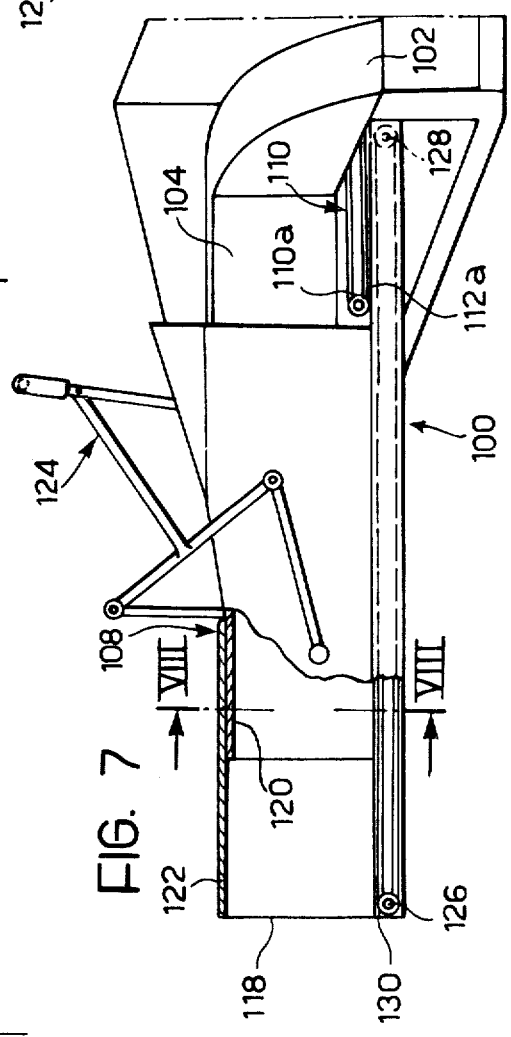

POULTRY LOADING APPARATUS

BACKGROUND OF THE INVENTION

The present invention relates to apparatus for loading poultry, such as chickens, turkeys and the like, from a rearing house into a series of housings arranged in vertical rows alongside the outside of the rearing house. These housings can be, for example, constituted by hen-coops carried by a transport vehicle intended to transfer the animals from the rearing quarters to a place of slaughter.

The object of the present invention is that of providing apparatus of the type indicated above which allows the loading of the poultry to be carried out in an almost totally automatic manner, so as to reduce considerably the use of personnel.

Another object of the present invention is that of providing a loading apparatus which is functional and versatile and usable for poultry of different dimensions and weights, such as, for example, chickens and turkeys.

Another object of the present invention is that of providing apparatus which allows loading of the poultry to be carried out in a rapid and reliable manner, substantially reducing the risks of damage or injury to the animals.

Another object of the present invention is that of providing apparatus of reduced bulk and therefore usable even with limited available space.

SUMMARY OF THE INVENTION

In accordance with the present invention, there is provided loading apparatus comprising:

(a) a continuous-belt elevator conveyor having a loading end located in correspondence with an exit from said rearing house and a discharge end projecting from the rearing house, (b) an assembly enclosure having convergent walls disposed within the rearing house and arranged to guide the poultry towards the loading end of the said elevator conveyor, (c) a vehicle movable transversely of said elevator conveyor and having a support structure carrying:

a first horizontal continuous-belt conveyor directed parallel to the longitudinal axis of the vehicle and arranged to receive poultry from the discharge end of the said elevator conveyor, an adjustable-inclination, continuous-belt conveyor disposed alongside the said first horizontal conveyor and having a transport direction opposite to that of the said first horizontal conveyor, the input end of said adjustable-incination conveyor being articulated about a transverse axis on the said support structure in a position substantially corresponding to the exit end of the said first horizontal conveyor, a second horizontal continuous-belt conveyor directed transversely to the longitudinal axis of the vehicle and arranged to transfer poultry from the exit end of the first horizontal conveyor to the input end of the said adjustable-inclination conveyor, a pneumatic forced-delivery unit associated with the exit end of the adjustable-inclination conveyor and including an outlet duct structure defining an outlet duct which is directed transversely to the longitudinal axis of the vehicle and has an outlet mouth facing away from the said elevator conveyor, said forced-delivery unit being operative to generate a directed air flow for urging poultry along said outlet duct, and means for vertically displacing the exit end of the adjustable-inclination conveyor and the outlet duct structure of the said pneumatic unit in dependence on the vertical position of the said housings intended to receive the poultry.

In a preferred embodiment of the invention the support structure includes means for vertically guiding movement of the exit end of the adjustable-inclination conveyor, the articulation of the input end of the said adjustable-inclination conveyor to the support framework being effected by an arrangement including guide means arranged to allow sliding of the said input end with respect to the support framework. Furthermore, the pneumatic unit is preferably fixed to the said exit end of the adjustable-inclination conveyor.

The pneumatic forced-delivery unit preferably includes at least one fan which together with an associated guide tube is arranged to generate an air flow within the outlet duct directed towards the said outlet mouth, and first and second consecutive continuous-belt conveyors whose directions of transport are substantially parallel to the axis of the outlet duct. The first of these conveyors is supplied from the exit end of the said adjustable-inclination conveyor while the second of these conveyors is disposed immediately downstream of the guide tube of the fan in a plane underlying that of the first conveyor. The conveying branch of the second consecutive conveyor is arranged to receive poultry from the first consecutive conveyor and constitutes at least part of the bottom wall of the said outlet duct. The transport speed of the second consecutive conveyor is made significantly greater than that of the first consecutive conveyor and less than that of the current of air generated by the fan.

BRIEF DESCRIPTION OF THE DRAWINGS

The invention will now be described in detail with reference to the attached drawings, provided purely by way of non limitative example, in which:

FIG. 4 is a transverse sectional view on line IV—IV of FIG. 3, FIG. 5 is a transverse sectional view on line V—V of FIG. 2, FIG. 6 is a schematic view in longitudinal section illustrating a second form of apparatus embodying the invention, this apparatus being similar to that illustrated in FIGS. 1 to 5, but intended for larger animals, FIG. 7 is a partially sectioned side view in the direction indicated by arrow VII of FIG. 6, and FIG. 8 is a transverse sectional view on line VIII—VIII of FIG. 7.

DESCRIPTION OF THE PREFERRED EMBODIMENTS

Figure 1:
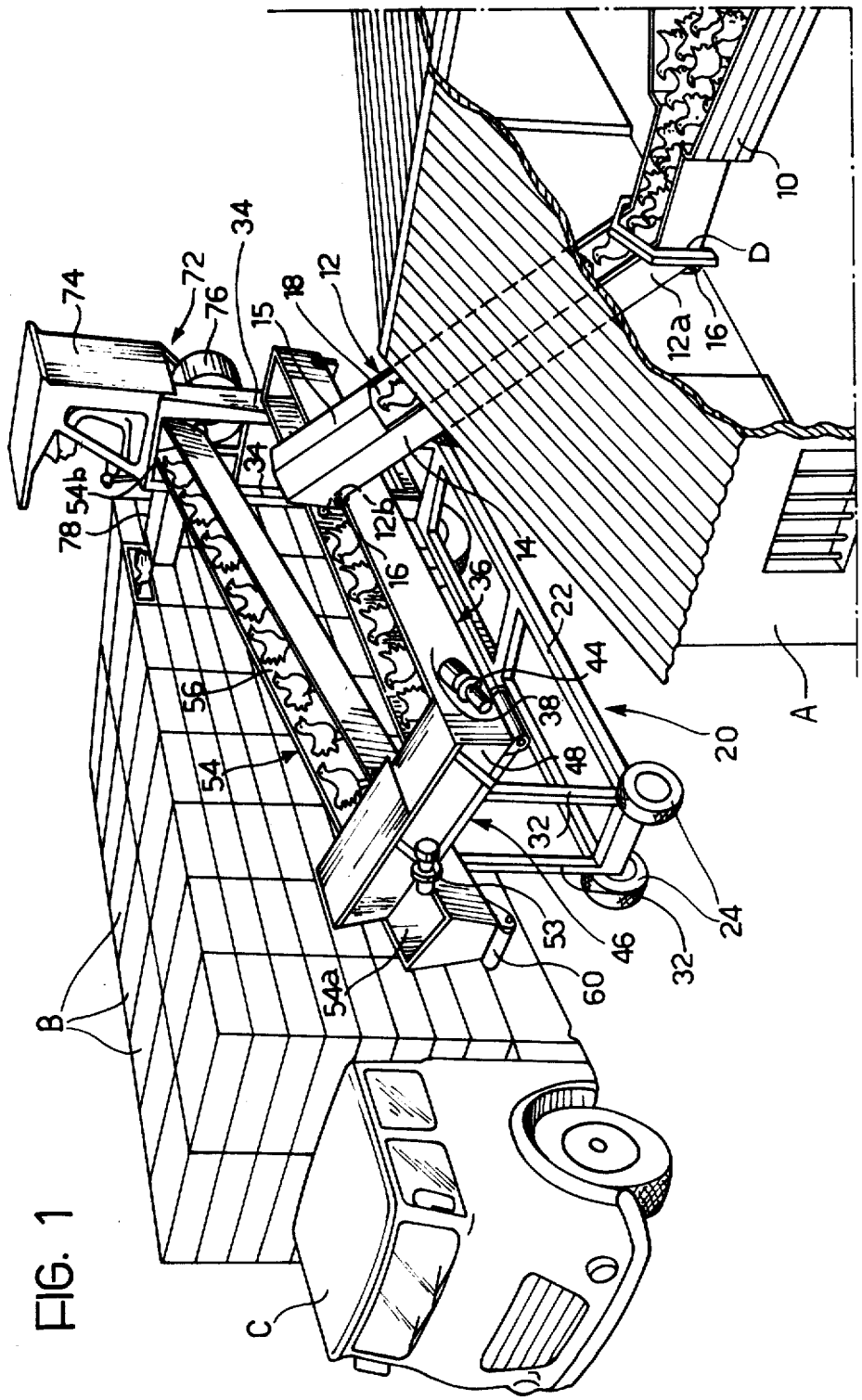
FIG. 1 is a schematic perspective view of a first form of loading apparatus embodying the invention.

In FIG. 1 there is schematically illustrated an apparatus embodying the invention for the loading of poultry from a rearing house A to a series of hen-coops B arranged in side-by-side vertical rows and carried by a motor lorry C serving, for example, for the transport of the poultry from their place of rearing to their place of slaughter. With reference to FIGS. 1 to 5 there will be initially described a form of the loading apparatus particularly suitable for the loading of poultry of small dimensions, for example chickens, whilst with reference to FIGS. 6 to 8 there will subsequently be described a second form of the apparatus suitable for the loading of poultry of greater dimensions, for example turkeys.

In FIG. 1, with 10 there is indicated schematically an assembly enclosure having convergent walls located within the rearing house A and terminating at an exit opening D of the building A.

Figure 2:
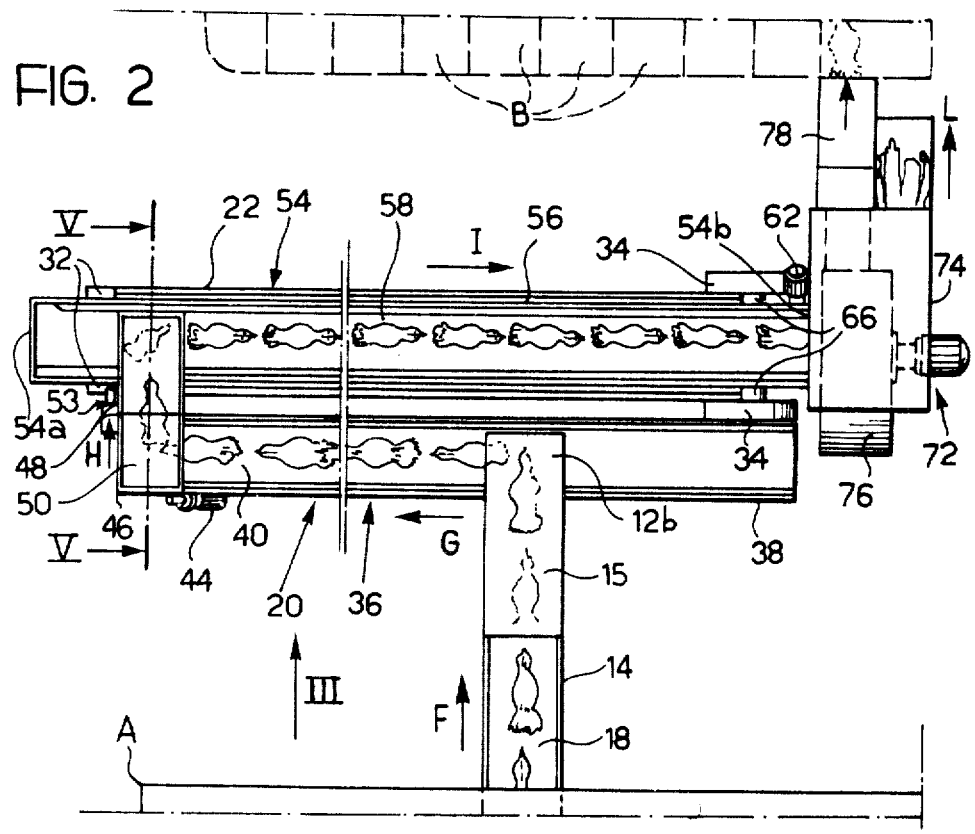
FIG. 2 is a schematic plan view from above of FIG. 1.
Figure 3:
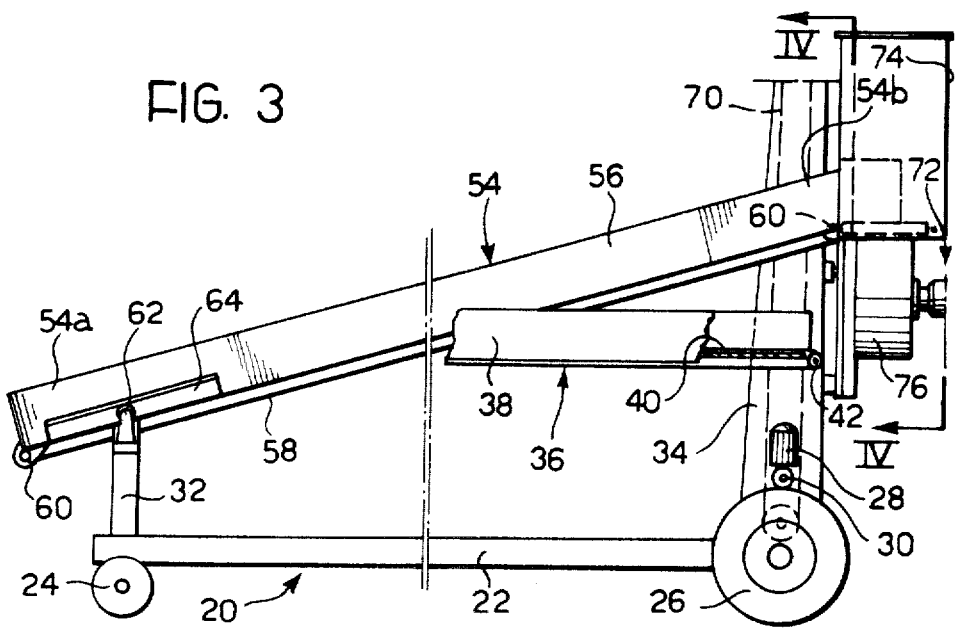
FIG. 3 is a schematic side view, partly broken away, in the direction indicated by arrow III of FIG. 2.

With 12 there is indicated a continuous belt elevator conveyor arranged to transfer the animals to be loaded from the exit opening D to a position outside the building A situated at an upper level with respect to that of the opening D. The elevator conveyor 12 includes a channel-form support structure 14 inclined upwardly and carrying at the lower, loading end 12a and the upper, discharge end 12b respective ones of a pair of transverse rollers 16 at least one of which is motorised, and around which passes a continuous conveyor belt 18. The conveying branch of the belt 18 rests on the bottom of the channel-form structure 14 and is movable in the direction of the arrow F (FIG. 2). This channel-form structure 14, which is supported in its inclined position by means of tie rods, not illustrated, fixed to the outside of the building A, is enclosed above, adjacent the discharge end 12b, by means of a roof 15 arranged to prevent the escape of the animals to be loaded.

With 20 there is indicated in its entirety a self propelled trolley interposed between the elevator conveyor 12 and the motor lorry C and extending transversely to the elevator conveyor 12. The trolley 20 comprises a frame 22 having a pair of front wheels 24 and a pair of rear wheels 26 driven by means of respective motors 28 and friction rollers 30.

The frame 22 mounts a pair of front struts 32, and a pair of rear struts 34, the latter having a height significantly greater than that of the front struts 2. The front and rear struts 32 and 34 disposed on the side of the trolley 20 facing the building A support externally a first horizontal continuous belt conveyor 36 directed parallel to the longitudinal axis of the trolley 20 and disposed in a position underlying the discharge end 12b of the elevator conveyor 12. The conveyor 36 has a configuration similar to that of the elevator conveyor 12 and includes a channel-form structure 38 along the bottom of which there is movable, in the direction of the arrow G (FIG. 2), the conveying branch of a continuous belt 40. The belt 40 passes around a pair of rollers 42 one of which is driven to rotate by means of a motor 44 as is illustrated in FIG. 5.

At the exit end 36a of the horizontal conveyor 36, and therefore in correspondence with the front struts 32, there is located a second horizontal continuous belt conveyor 46. The conveyor 46 is directed perpendicularly to the longitudinal axis of the trolley 20 and includes a channel-form structure 48 along the bottom of which there is movable, in the direction indicated by the arrow H (FIG. 2), the conveying branch of a continuous belt 50. The continuous belt 50 passes around a pair of rollers 52 (one of which is driven to rotate by means of a motor 53) and is disposed at a level immediately underlying that of the conveying branch of the belt 40 of the first horizontal conveyor 36. The second conveyor 46 supplies an adjustable inclination, continuous belt conveyor 54 which is disposed alongside the conveyor 36. The conveyor 36 includes a channel structure 56 and a belt 58 which passes around a pair of rollers 60 one of which is driven by means of a motor 62. The conveying branch of the belt 58 rests on the bottom of the channel-form structure 56 and is movable in the direction of the arrow I (FIG. 2). The input end 54a of the adjustable-inclination conveyor 54 is supported in a slidable manner between the front struts 32 of the trolley 20 by means of a pair of rollers 62 having horizontal axes. These rollers 62 are supported by the upper ends of the front struts 32 and are rotatable within respective guides 64 of a channel-form profile which are fixed to the outer faces of the side walls of the channel-form structure 56. The exit end 54b of the adjustable-inclination conveyor 54, is supported in a vertically slidable manner by means of vertical guides 66 carried by the rear struts 34 of the trolley 20. The vertical displacements of the exit end 54b, for the purpose of varying the inclination of the conveyor 54, are obtained by means of a control motor 68 and a chain transmission 70.

With 72 there is generally indicated a pneumatic forced-delivery unit rigidly connected to the exit end 54b of the adjustable-inclination conveyor 54 and therefore movable vertically up and down the rear struts 34 together with this exit end 54b. The pneumatic unit 72, with which there is associated, above, a control and manoeuvring cabin 74, essentially comprises a ducted electric fan 76, an outlet duct 78, and a first continuous belt conveyor 80 and a second continuous belt conveyor 82 disposed consecutively and having their respective conveying branches movable in the direction of the arrow L (FIG. 2). As is illustrated in FIG. 4 the outlet duct 78 is directed transversely to the longitudinal axis of the trolley 20 and comprises an initial widened part in the form of a chamber 84, an end part 86 which is in communication with the chamber 84 and has a convergent profile 86, and an outlet mouth 88 facing away from the elevator conveyor 12, and therefore towards the hen-coops B. The chamber 84 is provided above with a lateral aperture 90 which communicates with the exit end 54b of the adjustable-inclination conveyor 54 and below which there is located the first conveyor 80. The second conveyor 82 is located at the bottom of the initial section of the convergent part 86 of the outlet duct 78 and its input end 82a is located in a position underlying the exit end 80a of the first conveyor 80. Between the exit end 80a of the first conveyor 80 and the input end 82a of the second conveyor 82 there is interposed the end part of a convergent profile duct 92 constituting the guide tube of the electric fan 76. This guide tube is arranged to direct the flow of air generated by the electric fan 76 towards the outlet mouth 88 in the direction L (FIG. 2), tangentially to the conveying branch of the second conveyor 82. The speed of the current of air leaving the guide tube 92 is of the order of about 150 km per hour, whilst the linear speed of the conveying branch of the second conveyor 82 is lower than that of the jet of air, but significantly greater than the linear speed of the first conveyor 80a. The linear speed of the second conveyor 82 can be, for example, of the order of 125 km per hour.

On the walls of the part 86 of the outlet duct 78 there are mounted a first photocell 94 connected to a counter, not illustrated, for counting the animals supplied by the first conveyor 80 to the second conveyor 82, and a second photocell 96 also connected to a counter, not illustrated, to indicate the passage of twenty five animals through the outlet mouth 88.

The operation of the apparatus described above is as follows. The poultry collected in the enclosure 10 are conveyed towards the exit opening D of the building A and are subsequently loaded onto the elevator conveyor 12. The animals are thereafter transferred from the discharge end 12b of the elevator conveyor 12 to the conveyor belt 40 of the horizontal conveyor 36. The relative positions of this discharge end 12b and the horizontal conveyor 36, and therefore the reception position of the conveyor 36 can be widely varied by longitudinal displacement of the trolley 20 in dependence on the loading requirements of the animals into the coops B.

The animals are then transferred from the exit end 36a of the conveyor 36 to the input end 54a of the adjustable-inclination conveyor 54 via the second conveyor 46. The inclination of the conveyor 54 can be widely varied, by means of the motor 66 and the chain transmission 70, in dependence on the vertical position of the coops B intended next to receive the animals. In the condition illustrated in FIG. 1 the conveyor 64 is located in the maximum raised position to allow loading of the uppermost coops B.

The poultry are transferred individually from the exit end 54b of the conveyor 54 to the first conveyor 80 of the pneumatic unit 72. Due to the effect of the movement of the first conveyor 80 and to the low pressure zone generated within the chamber 84 during the operation of the electrical fan 76, the animals are successively transferred to the input of the convergent part 86 of the outlet duct 78. In this region the combined action of the second conveyor 82 and of the jet of air leaving the guide tube 92 causes the animals to pass rapidly through the outlet mouth 88 and be introduced into the interior of the coop B located opposite this outlet mouth 88. The photocells 94 and 96 serve to effect counting and control of the animals loaded. As soon as the prescribed number of animals to be inserted into a coop B has been reached, the apparatus is temporarily stopped and the pneumatic unit 72 moved up or down ready for loading of a vertically adjacent coop B. As soon as the loading of a vertical row of coops B has been completed, the trolley 20 is displaced longitudinally ready for loading a horizontally adjacent row of coops B. This cycle of operations is repeated until loading has been completed.

In FIGS. 6 to 8 there is illustrated a second form of apparatus which is suitable for loading poultry of large dimensions, for example turkeys. This form of apparatus differs from that already described solely in respect of the pneumatic forced-delivery unit, all the other parts of the apparatus being similar to those previously described with reference to FIGS. 1 to 5. In this second form of apparatus, the pneumatic unit is indicated in its entirety with 100 and includes a pair of side by side electric fans 102 provided with convergent guide tubes 104 opening into the interior of a common convergent propelling nozzle 106. The nozzle 106 extends coaxially into the interior of the initial part of the outlet duct of the pneumatic forced-delivery unit 108. The first conveyor of the pneumatic unit 100, (that is, the conveyor supplied by the adjustable inclination conveyor 54) is indicated 110 and extends axially into the convergent propelling nozzle 106. The exit end 110a of the first conveyor 110, is situated in front of the outflow mouth of the propelling nozzle 106 in a position overlying the input end 112a of the second conveyor 112. In this second form of the loading apparatus, given the greater weight of the animals to be loaded, the conveying branch of the belt of the second conveyor 112 constitutes the whole of the bottom of the outlet duct 108. The linear speed of displacement of the second conveyor 112 is in this case less than that of the conveyor 82 previously described, and can, for example, be of the order of 80 km per hour. The speed of the flow of air at the output of the convergent propelling nozzle 106 is, on the other hand, equal to that of the previous case and therefore of the order of about 150 km per hour. Also in this case there are provided two spaced photocells 114, 116 for counting the animals leaving the apparatus.

In this second form of the loading apparatus there are moreover provided means for adjusting the position of the outlet mouth 48 of the outlet duct 108, with respect to the trolley 20, as a function of the distance of the coops B carried by the motor lorry C from the trolley 20. The outlet duct 108 comprises in fact a fixed section 120 and a movable section 122 telescopically extendable with respect to the fixed section 120. The displacement of the movable section 122 can be effected by means of a lever system 124 manually controllable from a control and drive cabin, not illustrated in the drawings, also associated in this case with the pneumatic unit 100. Since, as previously mentioned, the conveying branch of the second conveyor 112 forms the whole of the bottom of the outlet duct 108, there are provided means for varying the horizontal position of this second conveyor 112 during the length adjustment of the outlet duct 108. As is illustrated in detail in FIGS. 7 and 8, the conveyor 112 is provided with a pair of front and rear return rollers 126 and 128 respectively, supported by a frame 130 disposed horizontally in a position underlying the outlet duct 108. The end of the frame 130 carrying the rear return roller 126 is rigidly fixed to the movable section 122 of the duct 108, whilst the other end corresponding to the rear return roller 128 is supported in a slidable manner by means of a pair of lateral rollers 132 movable in corresponding guides 134 mounted on the fixed part of the pneumatic unit 100.

The operation of the second form of apparatus is substantially similar to that described with reference to FIGS. 1 to 5. The only difference lies in the greater blowing effect caused by the flow of air set up by the two electric fans 102 in the region of transfer of the animals from the first conveyor 110 to the second conveyor 112 thanks to the above described configuration of the pneumatic unit 100 and to the possibility of adjustment of the length of the outlet duct 108.

From the preceding description it will be apparent that the described loading apparatus embodying the invention is extremely practical and functional, permits high loading speeds to be obtained, and lends itself to being utilised even in cases of limited available space outside the rearing house. The apparatus can be manoeuvred by a single operator, reducing in this way the necessity for specialised personnel, and is structured in such a way as to significantly reduce the risks of damage to the animals during the loading operation. Moreover, since each conveyor of the apparatus is provided with an independent motor, it is possible to easily adjust the conveying speed of each conveyor whereby to obtain a correct spacing between the animals supplied successively to the pneumatic supply unit and thus, avoid dangerous accumulations or obstructions within the apparatus.

I claim:

1. Apparatus for loading poultry from a rearing house to a series of housings disposed in vertical rows alongside the outside of the rearing house, said apparatus comprising:
(a) a continuous-belt elevator conveyor having a loading end located in correspondence with an exit from said rearing house and a discharge end projecting from the rearing house,
(b) an assembly enclosure having convergent walls disposed within the rearing house and arranged to guide the poultry towards the loading end of the said elevator conveyor,
(c) a vehicle movable transversely of said elevator conveyor and having a support structure carrying:
a first horizontal continuous-belt conveyor directed parallel to the longitudinal axis of the vehicle and arranged to receive poultry from the discharge end of the said elevator conveyor,
an adjustable-inclination, continuous-belt conveyor disposed alongside the said first horizontal conveyor and having a transport direction opposite to that of the said first horizontal conveyor, the input end of said adjustable-inclination conveyor being articulated in a position substantially corresponding to the exit end of the said first horizontal conveyor,
a second horizontal continuous-belt conveyor directed transversely to the longitudinal axis of the vehicle and arranged to transfer poultry from the exit end of the first horizontal conveyor to the input end of the said adjustable-inclination conveyor,
a pneumatic force-delivery unit associated with the exit end of the adjustable-inclination conveyor and including an outlet duct structure defining an outlet duct which is directed transversely to the longitudinal axis of the vehicle and has an outlet mouth facing away from said elevator conveyor, said forced-delivery unit being operative to generate directed air flow for urging poultry along said outlet duct, and
means for vertically displacing the exit end of the adjustable-inclination conveyor and the outlet duct structure of the said pneumatic unit in dependence on the vertical position of the said housings intended to receive the poultry.

2. Apparatus according to claim 1, wherein said support structure includes vertical guide means for guiding the vertical displacement of the exit end of said adjustable-inclination conveyor, the said pneumatic unit being fixed to the said exit end of the adjustable-inclination conveyor, and the articulation of the input end of the said adjustable inclination conveyor to the support structure being effected by an arrangement including guide means arranged to allow sliding of the said input end with respect to the support structure.

3. Apparatus according to claim 2, wherein the said pneumatic unit comprises
at least one fan with an associated guide tube, said fan and guide tube being operative to generate within the said outlet duct a current of air directed towards the said outlet mouth, and
first and second consecutive continuous belt conveyors having transport directions substantially parallel to the axis of the outlet duct, the first of said consecutive conveyors being arranged to receive poultry from the exit end of the said adjustable inclination conveyor, and the second of said consecutive conveyors being located immediately downstream of the guide tube of the fan in a plane underlying that of the said first consecutive conveyor, the conveying branch of said second consecutive conveyor being arranged to receive poultry from the first conveyor and constituting at least part of the bottom wall of the said outlet duct; the transport speed of the second consecutive conveyor being significantly greater than that of said first consecutive conveyor and less than that of the said current of air generated by the fan.

4. Apparatus according to claim 3, wherein the outlet duct of the pneumatic unit has an enlarged initial part in the form of a chamber which communicates with the exit end of the said adjustable-inclination conveyor and contains the said first consecutive conveyor, the guide tube of the fan being formed with a convergent terminal portion which opens into the lower part of the said chamber of the outlet duct in a position immediately beneath the exit end of the said first consecutive conveyor and immediately above the input end of the said second consecutive conveyor.

5. Apparatus according to claim 3, wherein the pneumatic unit includes a pair of fans arranged side by side, the said guide tube being substantially in the form of a convergent propelling nozzle supplied contemporaneously from both said fans, the conveying branch of the said first consecutive conveyor extending axially into said guide tube.

6. Apparatus according to claim 5, including adjustment means for adjusting the distance of the outlet mouth of the pneumatic unit from the support-structure of the vehicle.

7. Apparatus according to claim 6, wherein said adjustment means includes a telescopic arrangement of said outlet duct, and means for altering the length of the said outlet duct.

8. Apparatus according to claim 7, wherein the conveying branch of the said second consecutive conveyor of the pneumatic unit constitutes the whole of the bottom wall of the said outlet duct, said adjustment means including means for changing the horizontal position of the said second consecutive conveyor upon alteration of the length of the said outlet duct.

9. Apparatus according to claim 8, wherein the said means for changing the position of said second consecutive conveyor includes a support frame carrying the said second conveyor and having one end fixed to the said outlet duct structure adjacent the outlet mouth, and guide means carried by the said support structure and cooperating with the other end of the support frame to allow the horizontal sliding of the said support frame.

10. Apparatus according to claim 1, wherein there are provided means for automatically counting poultry delivered by the pneumatic unit.

11. Apparatus according to claim 1, wherein said vehicle is a self-propelled trolley.

* * * * *